UNITED STATES PATENT OFFICE.

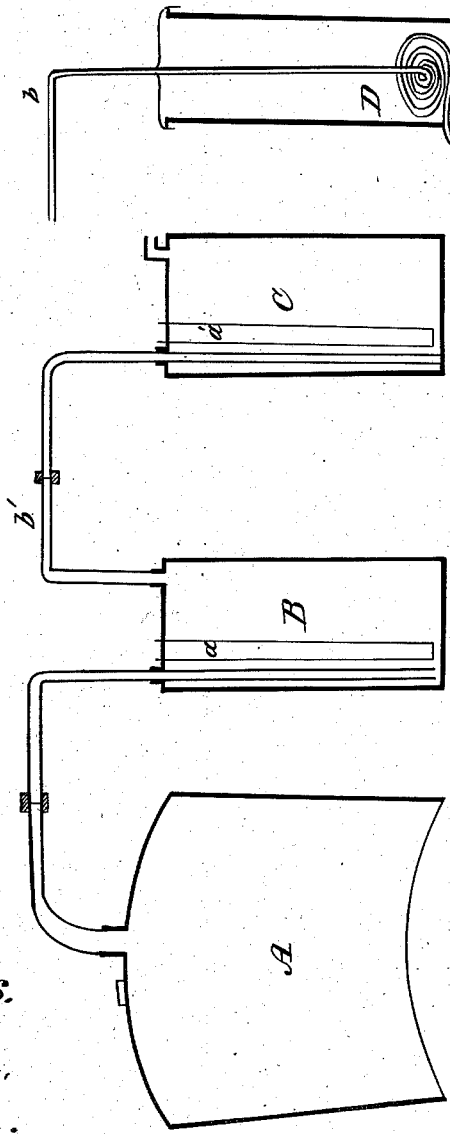

L. D. GALE, OF WASHINGTON, DISTRICT OF COLUMBIA.

IMPROVED PROCESS FOR PREPARING COFFEE.

Specification forming part of Letters Patent No. 48,268, dated June 20, 1865; antedated June 12, 1865.

*To all whom it may concern:*

Be it known that I, L. D. GALE, of Washington, District of Columbia, but now temporarily residing in the city, county, and State of New York, have invented a new and useful Improvement in the Preparation of Substitutes for Ordinary Ground Coffee; and I hereby declare that the following is a full and sufficient description thereof, reference being had to the accompanying drawings and references marked thereon, and making part of this description.

The nature of the invention consists in extracting from roasted coffee all the soluble parts of the same, including the volatile aroma contained therein, and putting the whole into the form of a dense and solid cake, that may be handled and packed without being inclosed in cans or their equivalents, and mixing the same with sugar or sugar and milk, in the manner hereinafter described.

In the accompanying drawings, A represents a boiler for extracting the soluble parts of the coffee; B, the first condenser; C, the second condenser; D, the third condenser. In the workings I have found three condensers more than is necessary, and so dispense with condenser C, and connecting $b'$, the discharge-pipe of B, directly with the pipe $b$ of condenser D. The boiler is for distilling over the volatile aroma and dissolving all that is soluble in the coffee. The water is chiefly condensed in the first condenser at 195° Fahrenheit. The volatile aroma, which is a volatile oil, is condensed at 85° in the second condenser. The aroma being too volatile to be retained in the first condenser, which retains the vapor of water, passes on to the second condenser, which retains nearly the whole of it. Either C or D may be used to collect the aroma; but the coil bringing more of the aroma vapor in contact with a cold surface, D is preferable as a condenser. Two hours are necessary to remove the principal part of the aroma. Two and a half or three hours would be better still. At the end of the boiling the contents of the boiler are discharged from the boiler, drained, and pressed in any suitable press, and the boiler charged anew, and the boiling repeated as before. The pressing is repeated (adding a quart of hot water to the five pounds of coffee used at each pressing) so long as the taste or color indicate remaining strength in the liquor.

Tubes $a$ and $a'$ may be used for inserting a thermometer, or the instrument may be inserted in the vessel surrounding the condenser, but not shown in the drawing.

That which renders coffee delicious as a drink is the aroma, which is an essential oil dissolved in the aqueous infusion. This oil is wholly dissolved in water, communicating to it a most agreeable fragrance. This fragrance is a factitious product produced by a certain amount of torrefaction, by a heat not less, according to my experiments, than 350° Fahrenheit nor greater than 375°. When roasted to a medium cinnamon brown the fragrance is like that of the delicate mignonette and as volatile as ether. It cannot be preserved in any vessel less porous than glass or earthen or metal ware. In all the preparations of coffee hitherto put up, the coffee once roasted, the pores being opened by the process, the aroma continues to escape till eventually none remains. Whether the coffee be kept in the bean or in the ground state the result is the same unless it be preserved in air-tight vessels or be pressed into solid cakes by means of cementing material impervious to the air.

I have discovered a means of preparing coffee by extracting the aroma and soluble but non-volatile extract from the ground and recombining the aroma and the extract and incorporating the same with sugar only, or with sugar and milk, into a dense and solid cake, which can be handled by itself like a cake of chocolate or a stick of candy and requires no box or can to protect it from the atmosphere.

The article prepared by me has the following advantages over other preparations before the public.

First. The cake-coffee is a perfectly uniform article, never varying in its proportion of ingredients or in its strength.

Second. It is prepared in one minute by chipping a half-ounce of the cake into a half-pint of boiling water, and it is ready to drink, the cake being entirely soluble in hot or cold water.

Third. It is dry and solid. Being hard pressed the pores are closed and the aroma is preserved for months without perceptible loss.

Fourth. It requires no paraphernalia of coffee-pots and strainers to prepare it. Although hot water is preferable to cold water in making the coffee, it is by no means indispensable, as either makes a very desirable drink.

Fifth. As this coffee was invented for the use of the army and navy, to aid the soldier and sailor in situations of exposure, where coffee as ordinarily prepared could not be procured, and often where neither hot nor cold water can be had, then the soldier or sailor in the heat of battle or the soldier in the midst of a weary march or watching may withdraw his dry coffee-cake from his knapsack or pocket and chew and swallow a half-ounce of the cake, which will mix with and melt in the saliva of the mouth without any drink whatever, and is equivalent as a restorative to the system to a half-pint of strong coffee.

Sixth. It is well known to physicians that coffee suspends digestion and thus becomes the means of temporary relief from hunger; and this cake taken in the dry state at the hour of the usual meal, and instead of the said meal, will sustain the body for three or four extra hours without the inconvenience of hunger equally well with coffee prepared in the usual way.

Seventh. In transportation the coffee-cake saves seven-tenths of the weight of the coffee and one-half of the bulk of the coffee and sugar together. This cake is therefore especially adapted to the wants of the army and navy, where reduction of bulk and of weight are important considerations. A cubic foot of this article weighs eighty-six pounds.

The process for the cake-coffee is substantially in the following manner: Into a suitable still or boiler, A, arranged to discharge the vapors into a suitable condenser, B, both being of copper, is poured as much fine-ground coffee as can be conveniently boiled, and the mass is covered with water enough to float the coffee—say two and one-half gallons to five pounds of coffee—and the contents boiled steadily for two hours. The vapors are discharged from the boiler through the liquid and at or near the bottom of the first condenser, which retains the condensed vapor of water at the temperature of, say, 180° to 200° Fahrenheit. The aroma of the coffee which is not condensed at the above-named temperatures of the first condenser passes on into the second condenser, which is kept at a temperature not lower than 75° nor higher than 85° If this experiment has been conducted carefully, nearly all the steam of water is condensed in the first condenser, and nearly all of the vapor of the coffee aroma is condensed in the second condenser. It is proper here to say that the temperature of the two condensers must be maintained throughout the operations uniformly, as hereinafter directed. Now, although most of the vapor of water will be condensed in the first condenser when kept at any temperature between 180° and 200°, still the temperature which condenses most steam and least aroma is 195°, or thereabout; and although nearly all of the volatile aroma of coffee will be condensed in the second condenser at 85° and at any degree down to 75°, or even lower, still the temperature which I regard as producing the best result is 85°, for if the temperature of the second condenser be below 80° there will be condensed with the said aroma a quantity of pyrogenous hydrocarbons, which communicate to the aroma a burnt flavor disagreeable to the taste, to obviate which the second condenser is carefully maintained at about 85° and the first condenser at about 195°. These results have been reached only after many months of unremitting labor and thousands of dollars of expense, though the facts when stated appear so plain and simple.

The invention therefore does not consist in learning the fact that steam is condensed at 185° or 195°, or that the aroma of coffee is condensed at 85°. Each as a separate fact may have been known before, but it was never known that these two facts could be so arranged and combined as to separate the aroma of coffee from the vapor of water in such manner that the former may be deposited in the second condenser, while the latter is deposited in the first condenser. What is therefore the subject of claim in this part of the invention is separating the aroma or volatile oil of coffee from the watery vapor by condensing the water in one condenser and the coffee-aroma in another.

Having boiled the coffee about two hours and collected the condensed water with a little aroma in the first condenser and the concentrated aroma in the second condenser the coffee-grounds and liquor of the boiler are discharged into a canvas bag or its equivalent and pressed to remove the infusion of coffee contained therein, and the infusion is boiled rapidly down to the consistence of molasses in a suitable copper pan or kettle over a brisk fire, or in any other suitable boiler, accompanied with agitation to keep down the heat. Instead of the press a centrifugal sugar-draining machine well known to sugar-refiners may be used. As soon as the proper consistence of the extract has been reached the extract is removed to a steam or water bath kettle, where the heat shall not exceed that of boiling water, and for every eight pounds of coffee used thirteen to sixteen pounds of dry pulverized sugar are added and the mixture thoroughly incorporated in any convenient way. At the same time that the extract and sugar are being incorporated a pound or so of the sugar is laid aside for absorbing into it the contents of second condenser. These being thoroughly commingled with the rest of the sugar into a homogeneous mass are rolled out into a flattened cake on a table between rollers with a traveling apron or pressed into molds, using pulverized sugar to prevent sticking. If it be worked with rollers, it may be cut into cakes of a given size, representing pounds and ounces, a half-ounce of which is sufficient to make a half-pint of strong coffee. Where this is to be exposed to damp air the sugar would become damp, as in an army tent, and some coating as gum-arabic, dextrine, starch, cocoa-butter, or other equivalent vapor-proof coating may be used. In some instances I have mixed the protecting material with the composition. In cases where milk is used I either purchase that furnished by the market or concentrate pure milk to the consistence of molasses, and add a quart of such condensed milk to ten or twelve pounds of the coffee and sugar mixture. It is added in the following manner: When the coffee-infusion is concentrated nearly to the molasses state the amount of milk to be mixed is poured into the semi-fluid extract, and the two thoroughly mingled and concentrated to a thin, pasty mass, when the sugar is added, as before directed. When milk is used in the composition no other protecting material is required, except that the surface may be frosted with sugar. There are concentrated milks in the market in which two or four gallons are concentrated into one. This composition makes a compact mass, closing the pores of the cake, of which it forms a part, and prevents the aroma from escaping, and also has the effect to harden the mass.

Having described the nature of the invention and the method of using the same, what I claim as my invention, and desire to secure by Letters Patent, is—

1. Separating the aroma or volatile oil of coffee from the watery vapor, substantially in the manner and for the purpose herein set forth.

2. The combination of the aroma with the soluble non-volatile parts of the coffee preparatory to making the same into a solid cake, substantially in the manner and for the purpose set forth.

3. A dense and solid cake-coffee that can be handled by itself like cakes of chocolate or sticks of candy, without the aid and expense of boxes or cans, which are indispensable in all that class of preparations called coffee-paste and coffee-extract.

L. D. GALE.

Witnesses:
 ELIZA G. GALE,
 C. G. ALLEN.